(12) United States Patent
Adams et al.

(10) Patent No.: US 9,725,675 B2
(45) Date of Patent: Aug. 8, 2017

(54) LIPID-SOLUBLE FORMULATIONS CONTAINING MIXTURES OF ANTIOXIDANTS

(75) Inventors: Clifford Adams, Antwerp (BE); Stefaan Van Dyck, Brasschaat (BE); Aimee Teunckens, Meerhout (BE); Tom Verleyen, Wilrijk (BE)

(73) Assignee: KEMIN INDUSTRIES, INC., Des Moines, IA (US)

( * ) Notice: Subject to any disclaimer, the term of this patent is extended or adjusted under 35 U.S.C. 154(b) by 113 days.

(21) Appl. No.: 13/347,498

(22) Filed: Jan. 10, 2012

(65) Prior Publication Data
US 2012/0215016 A1 Aug. 23, 2012

Related U.S. Application Data

(63) Continuation of application No. 10/407,285, filed on Apr. 4, 2003, now abandoned.

(51) Int. Cl.
| | | |
|---|---|---|
| C11B 5/00 | (2006.01) | |
| C09K 15/08 | (2006.01) | |
| A23L 3/3463 | (2006.01) | |
| A23L 3/349 | (2006.01) | |
| A23L 3/3499 | (2006.01) | |
| A23L 3/3472 | (2006.01) | |

(52) U.S. Cl.
CPC .......... *C11B 5/0092* (2013.01); *A23L 3/3463* (2013.01); *A23L 3/3472* (2013.01); *C09K 15/08* (2013.01)

(58) Field of Classification Search
None
See application file for complete search history.

(56) References Cited

U.S. PATENT DOCUMENTS

| | | | |
|---|---|---|---|
| 2,500,543 A | 3/1950 | Hall | |
| 4,182,779 A | 1/1980 | Chess | |
| 4,891,231 A | 1/1990 | Mai | |
| 5,166,375 A | 11/1992 | Kameoka | |
| 5,206,219 A | 4/1993 | Desai | |
| 5,230,916 A | 7/1993 | Chang | |
| 5,314,686 A | 5/1994 | Todd | |
| 5,527,552 A | 6/1996 | Todd | |
| 5,562,938 A * | 10/1996 | Lee et al. | 426/106 |
| 5,837,307 A * | 11/1998 | Bodor et al. | 426/603 |
| 5,902,591 A | 5/1999 | Herstein | |
| 5,948,926 A | 9/1999 | Takeo | |
| 6,087,391 A | 7/2000 | Weidner | |
| 6,207,290 B1 * | 3/2001 | Blum et al. | 428/540 |
| 6,235,721 B1 | 5/2001 | Ghosal | |
| 6,413,561 B1 * | 7/2002 | Sass et al. | 426/74 |
| 6,682,763 B2 | 1/2004 | Kuno et al. | |
| 2002/0176903 A1 | 11/2002 | Kuno | |
| 2003/0049158 A1 * | 3/2003 | Hui et al. | 422/1 |

FOREIGN PATENT DOCUMENTS

| | | |
|---|---|---|
| EP | 0440398 | 8/1991 |
| EP | 1344516 | 9/2003 |
| GB | 1317865 | 5/1973 |
| JP | 59045860 | 3/1984 |
| JP | 61127786 A * | 6/1986 |
| JP | 2002142673 | 5/2002 |
| JP | 2002142673 A * | 5/2002 |
| WO | WO 0025738 | 5/2000 |

OTHER PUBLICATIONS

Enlgish translation of JP 2002-142673, original document published May 21, 2002.*
Derwent abstract of JP 61-127786, original document published Jun. 16, 1986.*
Sagitani, JAOCS Jun. 1981, p. 738-743.*
Definition of "phase" from Hawley's Chemical Condensed Dictionary, 14th edition, 2002.*
Dufour, C., Dasilva, E., Potier, P., Queneau, Y., and Dangles, O., "Gallic esters of sucrose as efficient radical scavengers in lipid peroxidation", J. Agric. Food Chem, 50, pp. 3425-3430, Dec.
Branen, A.L., "toxicology and biochemistry of Butylated hydroxyanisole and butylated hydroxytoluene", Journal American of Oil Chemist's Society, 52, pp. 59-63, Feb. 1975.
Brookes, G., "The EU animal feed sector: protein ingredient use and implications of the ban on use of meat and bonemeal", Jan. 15, 2001, pp. 1-22.
"Food Grade Antioxidant Complex" Eurotiox, AGC 40 L, Oct. 1998.
"Oil Stability Index", AOCS Official Method, pp. 1-5, 1997.
Human translation of JP 2002-142673, Original document published May 21, 2002.
Derwent abstract of JP 61-127786, which was originally published in Jun. 1986.
Sagitani et al. JAOCS, Jun. 1981, p. 783-743.
Definition of "phrase" from Hawley's Chemical Condensed Dictionary, 14th edition, 2002.

* cited by examiner

*Primary Examiner* — Nissa Westerberg
(74) *Attorney, Agent, or Firm* — Nyemaster Goode, P.C.

(57) ABSTRACT

A substantially oil- and fat-free single phase, homogenous antioxidant formulation that is readily dispersible in lipid matrices at ambient temperature by gentle stirring. The formulation includes a phenolic antioxidant compound, a liquid carrier, preferably a metal chelator, an emulsifier, and a polarity modifier. In preferred embodiment, a combination of lipid-soluble and water-soluble antioxidant compounds is included to provide an improved antioxidant effect.

17 Claims, No Drawings

LIPID-SOLUBLE FORMULATIONS CONTAINING MIXTURES OF ANTIOXIDANTS

This application is a continuation-in-part application of Ser. No. 10/407,285 filed on Apr. 4, 2003.

BACKGROUND OF THE INVENTION

The invention relates generally to a mixture of antioxidants and, more specifically, to lipid-soluble formulations that contain a mixture of both lipid- and water-soluble antioxidants.

Lipid autoxidation is the chemical term for a series of destructive processes that readily occur in organic materials by the reaction with molecular oxygen (Lipid Oxidation, E. N. Frankel, Chapter 1, The Oily Press, Dundee, 1998). There are three separate steps in the lipid autoxidation scheme. In the first step (initiation phase) free radicals are gradually formed. Radicals can be formed spontaneously or they can be produced by the thermal or metal catalyzed decomposition of hydroperoxides. The initiation phase in lipid oxidation mainly depends on the fatty acid composition expressed by the degree of unsaturation and the level of metal contamination. In the second step or propagation phase free radicals react with oxygen to form peroxyl radicals. The rate of oxidation accelerates which indicates the autocatalytic nature of the reaction. There is a rapid absorption of molecular oxygen and peroxides are progressively formed. The third step or termination phase, comprises the recombination of various radical species and the lipid autoxidation reaction slows down.

Oils and fats are major constituents in human and animal nutrition. Due to the autoxidation process, lipids will become rancid and undesirable flavor and odor components will be formed. Oxidized oils and fats will become unpalatable and the ingestion of highly oxidized vegetable fat results in a loss of appetite. In addition lipid oxidation will result in a rapid destruction of vitamins and other dietary components reducing the nutritional value of the food and feed matrix. Taking into account all these factors, it is important that effective measures are taken to stabilize oils and fats against oxidation.

The lipid autoxidation process of oils and fats can be delayed by phenolic antioxidants (Lipid Oxidation, E. N. Frankel, Chapter 8, The Oily Press, Dundee, 1998). Inhibition of the free radical autoxidation process by antioxidants is of considerable importance to preserve lipids from oxidative deterioration. Antioxidants inhibit or delay lipid oxidation by capturing lipid radicals and peroxyl radicals. Phenolic compounds with bulky alkyl substituents are effective chain breaking antioxidants because they produce stable and unreactive antioxidant radicals. These antioxidant radicals do not have enough energy to react with the fat to form new free radicals and therefore these antioxidants are called free radical scavengers or primary antioxidants.

Over the past decades especially, synthetic antioxidants such as BHA, BHT, and ethoxyquin have been used extensively in human food and animal feed. An increased concern regarding the application of these synthetic antioxidants has been observed over the last decades, due to the possible mutagenic and carcinogenic character of these products (Toxicology and Biochemistry of Butylated Hydroxyanisole and Butylated Hydroxytoluene, Journal of the American Oil Chemist's Society, Branen, pp. 59-63, 1975).

There has accordingly been an increased amount of attention directed towards natural antioxidants tocopherols, extract of herbs, spices and hulls (e.g., gallic acid, rosemary, sage and thyme), flavones, carotenoids, anthocyanidins, and others (Lipid Oxidation, E. N. Frankel, Chapter 8, The Oily Press, Dundee, 1998). However these natural antioxidants are more expensive compared to synthetic antioxidants, and in sectors where price is an important issue natural antioxidants are not often used.

In this respect semi-synthetic antioxidants can offer a solution. The most commonly used semi-synthetic antioxidants are esters of gallic acids such as propyl gallate and octyl gallate. The distribution and application of these semi-synthetic antioxidants is becoming more and more important.

However, the production of antioxidant formulations based on natural and semi-synthetic antioxidants is more difficult. Generally, those phenolic compounds, such as gallic acid and derivatives, flavones, phenolic di- and triterpenes, extract from sage, rosemary, thyme, and others, consist of polar groups which do not dissolve in a lipid system. While these antioxidants dissolve in a polar carrier, such as monopropylene glycol, glycerol, water, and others, such a polar carrier does not dissolve in an apolar lipid system. Mixing of an antioxidant formulation based on such a polar carrier in a lipophillic matrix immediately results in the separation of the antioxidant formulation and a homogeneous distribution of the antioxidant formulation is not achieved.

The inclusion of a metal chelator such as citric acid, phosphoric acid, and others in an antioxidant formulation is advantageous for its metal chelating activity (Lipid Oxidation, E. N. Frankel, Chapter 7, The Oily Press, Dundee, 1998). However, metal chelators only dissolve in polar solvents as well. As a consequence it is a challenge to formulate an antioxidant formulation which combines the inclusion of a metal chelator with oil solubility.

Due to the hydrophilic groups present in phenolic compounds and metal chelators they are either totally insoluble or very sparsely soluble in fatty systems. These polar compounds can be rendered fat-soluble by several methodologies.

The traditional procedure to render polar compounds lipid soluble is by synthesis (Drug Formulation, I. Racz, Chapter 4, John Wiley and Sons, 1989 and Dufour et al. J. Agric. Food Chem., 2002, 50, pp. 3425-3430). This is carried out by addition of an aliphatic side chain in order to increase the lipophylic character of the product. Esterification with a suitable fatty acid is a common practice to increase the lipid solubility. For example propyl gallate, octyl gallate and dodecyl gallate are derived from gallic acid and ascorbyl palmitate is derived from ascorbic acid. While these derived compounds have significantly increased lipid solubility, long mixing times at elevated temperatures are still required in order to make these compounds completely soluble into an oil and fat matrix.

Liposomes have also been used to introduce polar compounds into an oil and fat system. Liposomes consist of one or more concentric spheres of lipid bilayers surrounding an aqueous compartment. If liposomes are incorporated in a fatty system, the hydrophilic compounds remain separated from the fatty system because the hydrophilic compounds do not dissolve and are present as a heterogeneous dispersion. The use and success of liposomes has been rather limited (see "Drug Targeting and Delivery", Chapter 6, edited by H. E. Junginger, Ellis Horwood 1992).

Another possibility is the formation of solid antioxidant particles of small particle size (e.g. micron size), which suspend easily in oils and fats. This procedure has been carried out with ascorbyl palmitate (U.S. Pat. No. 5,314,686).

A variety of commercial products are available, but none have the advantages of the present antioxidant system. Oxitrap ME (Nordos, Belgium) is a product based on BHA, propyl gallate and fatty acids esterified with citric acid. This product does not contain a synergistic combination with other gallates. Gallic acid itself will not dissolve in this type of product. Citric acid is present as an ester, which significantly reduces the chelating activity.

Loxidan TL 400 (Lohmann Animal Health GmbH, Germany) is a product that contains 26% ethoxyquin, 7% propyl gallate and 4% citric acid. Again this is a formulation is without a synergistic combination with other gallates. The formulation contains ethoxyquin, an antioxidant that can also function in part as a solvent for gallates. Formulations without ethoxyquin will be less effective in dissolving propyl gallate and citric acid. This limits the application because ethoxyquin is becoming less widely accepted.

Eurotiox L32 (Eurotec Nutrition, S.I., Spain) is a product that contains BHA, citric acid and propyl gallate, but the solvent is polyethylene glycol, which is not allowed in the European Union. This formulation has no synergistic combination with other gallates.

Ban-ox (Alltech, Inc., U.S.) is a product that does not contain a synergistic combination of gallates. This product also contains high amounts of iso-propanol, a flammable compound. Most antioxidants are used during the processing of fats and oils. This processing often occurs at higher temperatures, which means that flammable formulations cannot be used.

Liquid antioxidant formulations have been used for a long time in the food and feed industry. A liquid antioxidant formulation has the advantage of dissolving easily into the lipid system. The carrier used in an antioxidant formulation should dissolve the antioxidant in a considerable concentration (generally up to 10-30% antioxidant) and upon introduction into the lipid system disperse easily. An antioxidant formulation based on BHT or BHA can easily be based on a vegetable oil as carrier with good solubility in an oil system.

There has been a need in the market for an antioxidant formulation that could protect vegetable oils more efficiently than the current available formulations. This need is particularly important in the European Union because the use of animal fats in feed production decreased very rapidly after the "Mad Cow Disease" (bovine spongiform encephalitis) crisis in Europe. Feed ingredients from an animal source were replaced with ingredients from a vegetable source. Because vegetable oils are more unsaturated, an antioxidant formulation that was especially potent in this type of lipid matrix was needed.

SUMMARY OF THE INVENTION

The invention consists of an antioxidant system which incorporates phenolic antioxidant compounds into a liquid formulation that is readily dispersible in lipid matrices, such as oils and fats. The products of the invention include a phenolic antioxidant, a liquid carrier, an emulsifier and a polarity modifier. Preferably, a water-soluble antioxidant compound is also used in the products. The invention involves the mixing of antioxidants of different polarities, polar and non-polar, such that they are combined in a monophase liquid composition which readily dissolves in oil and fat matrices but contains substantially no oil or fat prior to that addition. The phenolic antioxidant compounds include gallic acid, gallic acid esters, flavones, phenolic di- and tri-terpenes, and phenolic extracts of sage, rosemary and thyme. The carrier includes water, monopropylene glycol, polyethylene glycol, and glycerol. The emulsifier includes acylglycerides, di-acylglycerides, phospholipids, and lyso-phospholipids. The polarity modifier includes short chain fatty acid such as propionic acid, butyric acid and acetic acid. The products also preferably include a metal chelator. Natural antioxidants that may be used in the products include gallic acid, tocopherols, carotenoids, anthocyanidins and non-phenolic extracts of herbs, spices and hulls. In a preferred embodiment, the invention comprises about 5% citric acid, between 25-30% monopropylene glycol, between 15-25% propionic acid and between 25-30% monoglycerides.

The developed antioxidant formulation contains a single homogenous phase which is not a microemulsion. Emulsions are a poor system for applying antioxidants to an oil/fat matrix because in an oil-in-water emulsion the oil phase (including oil soluble antioxidants) will dissolve readily in the continuous oil phase of the matrix one is trying to protect against oxidation, and the water droplets may assemble resulting in larger droplets which will sink to the bottom of the vessel containing the lipid matrix. Consequently the water soluble antioxidants cannot be effective because they do not dissolve in the oil and they are not available at the oil/air interphase where most oxidation takes place as the water phase with the water-soluble antioxidants always sinks to the bottom of the vessel.

The developed antioxidant system is a powerful antioxidant with special characteristics and is adaptable to provide a wide range of antioxidant products. The present antioxidant system addresses problems in the marketplace associated with stabilization of vegetable oils, replacement of ethoxyquin, and development of more potent antioxidant formulations. The present formulations provide a synergistic effect that is particularly surprising because all gallates have the same basic molecular skeleton leading one skilled in the art to expect that the mode of action would be identical for all these molecules. This could only be expected to lead to a linear additive effect and not to synergism.

Until the present invention, no known products based on gallic acid have been available.

DETAILED DESCRIPTION OF THE PREFERRED EMBODIMENTS

The antioxidant formulation of the invention comprises the introduction of natural antioxidants, a semi-synthetic antioxidants and a metal chelator in a liquid carrier having good dispersability in diverse oils and fat matrices. The invention is a single-phase In a preferred embodiment, the natural antioxidant is gallic acid, the semi-synthetic antioxidants are propyl and octyl gallate, the metal chelator is citric acid, and the oil and fats matrices comprise soybean oil, rapeseed oil, corn oil, sunflower oil, lard, tallow, palm oil, cacao butter, coconut oil, methyl esters of fatty acids, and others.

The antioxidant system of the present consists of four main components. The combination of these four components into the final antioxidant system provides a homogenous single-phase product that is substantially free of fats or oils and maintains excellent solubility in a lipophilic system independent of the temperature:

(1) Natural, semi-synthetic and synthetic antioxidants can be combined in the formulation at high levels. In addition, an organic acid such as ascorbic acid and/or citric acid can be included in the formulation.

(2) The antioxidant system is a liquid carrier which is able to dissolve the antioxidants and organic acids. Due to the polar character of gallic acid and propyl gallate a polar carrier is required. Suitable polar carriers include water, monopropylene glycol, glycerol, polyethylene glycol, and the like.

(3) An emulsifier is necessary in order to make the liquid carrier soluble in a lipophilic system. Suitable emulsifiers include mono acylglycerides, di-acylglycerides, (lyso)-phospholipids, and the like.

(4) In addition, a polarity modifier such as an organic acid of short chain fatty acids is required to optimize the polarity of the formulation. Suitable polarity modifiers include propionic acid, butyric acid, acetic acid, and the like. The polarity modifiers are typically a relatively polar ingredient. Upon dissolving the antioxidants in the carrier and the emulsifier, the polarity of this combination will change, making it necessary to use a polarity modifier to assure the stability of the formulation and avoid precipitation or segregation of the system.

Products of the invention can be produced in a simple liquid mixer. Stirring is sufficient to produce the formulation. The concentrations of all ingredients can be changed independently in that all of the ingredients can be obtained in a chemically pure form. This allows the formulator to modify the formulation in order to obtain the best possible protection and synergism for a given lipid matrix. Further, there is no production step in the production process of these formulations which requires energy, such as e.g. evaporation of solvents, and all ingredients and the solvent system are allowed by law for use in animal feed. The combination of the ingredients has a synergistic effect on the improvement of oxidative stability of vegetable oils and other lipid matrices.

A lower concentration is needed to reach a certain level of protection of the lipid matrix. This is cost-efficient and also the level of the additive is reduced. This reduces the chance that the additive has an effect on other product characteristics such as taste or color. This makes the formulations very useful to protect feed and food.

Further the product is readily soluble in lipid matrices. This means that it can be applied very easily, just by gentle stirring. No emulsification or high shear mixing is needed.

Composition of Active Ingredients: Antioxidants and Metal Chelators (1) Gallic acid, propyl gallate and ascorbic acid hardly dissolve in carriers commonly used in antioxidant formulations based on apolar carriers (e.g., vegetable oils).

(2) An antioxidant formulation solely based on emulsifiers does not allow the introduction of gallic acid and propyl gallate into a lipid system as gallic acid and propyl gallate have a limited solubility in emulsifiers. As a consequence, a polar carrier is required which does not dissolve directly into a lipid system.

(3) Natural antioxidants, derived semi-synthetic antioxidants and synthetic antioxidants (e.g., butylated hydroxyltoluene [BHT], and butylated hydroxyanisole [BHA]) can be combined in a single system in order to obtain a synergistic effect between the different antioxidants.

(4) A metal chelator is included in the antioxidant formulation.

(5) All ingredients should be mixed in a proper order and the right combination in order to prepare a stable antioxidant system.

(6) The antioxidant formulation is stable upon prolonged storage, even at refrigerator temperatures.

Solubility

The antioxidant system proposed in the invention is based on a liquid carrier, which is directly dissolving into a lipid system. Neither heating nor high shear mixing is required to dissolve the proposed antioxidant system into an oil and fat system independent of its temperature. As a consequence, the proposed formulation does not require special equipment or investments in order to introduce the antioxidants into the lipid system.

Description of the Experimental Conditions

Evaluation of Oil Solubility.

Following visual test was carried out to evaluate the oil solubility of the developed antioxidant systems. The water-soluble coloring agent Ponceau 4 Red was introduced in order to color the formulation. Mixing of the colored antioxidant formulation into a lipid system directly resulted in a homogeneous coloring of the lipid system.

Evaluation of Antioxidant Stabilization.

Oils and fats have a resistance to oxidation which depends on the degree of oxidation, presence of antioxidants, pro-oxidants etc. At room temperature oxidation is a slow process and takes several months. In order to evaluate the oxidative stability of an oil or fat sample an accelerated method is developed to speed up the oxidation process. This test was carried out with the Oil Stability Index (OSI) according to the AOCS Official Method Cd 12b-92 (American Oil Chemist's Society, Illinois, 1996). This method is particularly suited to evaluate the effect of antioxidant stabilization of oils and fats.

Before oils and fats start to oxidize a resistance has to be overcome, after which the oxidation accelerates and becomes very rapid. The length of time before this rapid acceleration of oxidation is a measure of the resistance to oxidation and is commonly referred to as the 'induction period'. In the Oil Stability Index (OSI method) the oxidative stability and the effect of antioxidant stabilization of oils and fats is determined. A stream of purified air is passed through a sample of oil, which is held in a thermostatic bath. In this experimental test the OSI was carried out at a temperature of 98° C. The effluent air from the oil or fat sample is then bubbled through a vessel containing deionized water. The conductivity of the water is continually monitored. The effluent air contains the volatile organic acids formed upon oxidizing the oil. The Oil Stability Index is defined as the point of maximum change of the rate of oxidation, or mathematically as the second derivative of the conductivity curve. As a consequence the induction point is a measure for the oxidative stability of the oil or fat system. The higher the induction point the higher the oxidative stability of the oil.

Example 1—Preparation of a Stable Liquid Antioxidant Formulation

An example of an antioxidant formulation is a combination of the synthetic antioxidants gallic acid, propyl gallate and octyl gallate and citric acid as metal chelator. In order to dissolve gallic acid and propyl gallate, enough carrier, in this case, monopropylene glycol, is required. In order to introduce the active antioxidants easily into an oil or fat system, an appropriate range of emulsifiers, such as mono-glycerides, and organic acids, for example, propionic acid, are needed. The active ingredients are formulated in a single liquid antioxidant system without harming the product stability and mixing properties of the formulation into a lipophilic carrier. Based on this concept, several different combinations can be prepared by altering the level of the different ingredients.

A first formulation, Formulation 1, comprises, by weight, 7% gallic acid, 10% propyl gallate, 3% octyl gallate, 5% citric acid, 27.5% monopropylene glycol, 19% propionic acid, 26.5% monoglycerides, and 2% phospholipids. Evaluating Formulation 1 on soybean oil in OSI resulted in an induction time of 27.9 h at a level of 500 ppm and 37.0 h at a level of 1000 ppm. The control soybean oil not treated with an antioxidant had an induction time of 14.8 h. These data indicate the effectiveness of the developed antioxidant to stabilize diverse oils and fats.

Example 2—Influence of Gallic Acid in the Antioxidant Formulation

An antioxidant formulation which contains gallic acid, specifically comprising 7% gallic acid, 10% propyl gallate, 2% octyl gallate, 5% citric acid, 27% monopropylene glycol, 20% propionic acid, and 29% monoglycerides, was designated Formulation 2. It was compared with a formulation in which gallic acid was interchanged with propyl gallate, specifically, 17% propyl gallate, 2% octyl gallate, 5% citric acid, 27% monopropylene glycol, 20% propionic acid, and 29% monoglycerides, herein designated as Formulation 3. Note that the total antioxidant level remained unchanged at a level of 20%. According to the OSI induction time of both formulations tested in soybean oil, it is observed that the antioxidant system containing gallic acid (Formulation 2), which gave an OSI induction time of 26.7 h at a level of 500 ppm and an OSI induction time of 34.2 h at a level of 1000 ppm, has a higher antioxidant stability and longer OSI induction times compared to the formulation based on propyl gallate (Formulation 3), which gave an OSI induction time of 24.6 h at a level of 500 ppm and an OSI induction time of 32.9 h at a level of 1000 ppm. This evidences a synergistic effect between gallic acid and propyl gallate and demonstrates the beneficial effect of gallic acid as an effective antioxidant in the formulation.

Example 3—Influence of Octyl Gallate in the Antioxidant Formulation

The beneficial effect octyl gallate in the antioxidant system is demonstrated in this example. Octyl gallate was removed from the antioxidant formulation of Formulation 1; specifically, the composition comprises 7% gallic acid, 10% propyl gallate, 5% citric acid, 27% monopropylene glycol, 20% propionic acid, and 29% monoglycerides, denominated herein as Formulation 4, and the antioxidant mixture was tested in soybean oil. Formulation 4 gave an OSI induction time of 24.0 h at a level of 500 ppm and an OSI induction time of 30.0 h at a level of 1000 ppm. Removal of octyl gallate from the formulation significantly reduces the OSI induction time, which indicates a reduced antioxidant activity of Formulation 4 compared to an antioxidant formulation containing octyl gallate, Formulation 1.

Example 4—Inclusion of Other Synthetic Antioxidants in the Antioxidant Formulation In the developed antioxidant formulation, synthetic antioxidants such as BHT, BHA, and others can be included as well. An example of an antioxidant formulation including BHT is given in Formulation 5, comprised of 7% gallic acid, 10% propyl gallate, 3% octyl gallate, 5% citric acid, 30% monopropylene glycol, 19% propionic acid, and 26% monoglycerides. An example of an antioxidant formulation including BHA is given in Formulation 6, comprising 7% gallic acid, 12% propyl gallate, 5% BHA, 5% citric acid, 27% monopropylene glycol, 20% propionic acid, and 29% monoglycerides. Formulation 5 gave an OSI induction time of 26.3 h at a level of 500 ppm and an OSI induction time of 34.5 h at a level of 1000 ppm. Formulation 6 gave an OSI induction time of 25.2 h at a level of 500 ppm and an OSI induction time of 34.9 h at a level of 1000 ppm. Formulation 5 and 6 are less active compared to Formulation 1, which contains octyl gallate in the antioxidant mixture. These data indicate the superior activity of the semi-synthetic octyl gallate above synthetic antioxidants.

Example 5—Efficacy of the Proposed Formulation

The efficacy of Formulation 1 was compared with antioxidant formulations based on single antioxidants; BHT, BHA, gallic acid, propyl gallate and octyl gallate as reference. Data of the antioxidant system of Formulation 1 was also collected. All antioxidant formulations were prepared based on a similar level of total antioxidants of 20%. Testing of their antioxidant efficacy was carried out on soybean oil. The OSI data are presented in Table 1.

TABLE 1

OSI induction time (h) of formulations based on single antioxidants
Concentrate: 250 ppm of antioxidant formulation

| Replicate | BHA | BHT | Gallic acid | Propyl gallate | Octyl gallate | Formula 1 |
|---|---|---|---|---|---|---|
| 1 | 14.0 | 15.5 | 21.6 | 19.5 | 19.3 | 21.3 |
| 2 | 14.2 | 15.4 | 20.7 | 21.5 | 19.3 | 21.2 |
| 3 | 14.5 | 15.0 | 22.0 | 20.1 | 19.5 | 21.6 |

Antioxidant formulations were based on 20% active antioxidant dissolved in the same carrier as used in Formulation 1.

According to the experimental data the antioxidant formulation of the invention stabilizes the oil significantly better compared with single antioxidants. BHA and BHT are frequently used as antioxidants in the food and feed industry, however compared with gallic acid, propyl gallate and octyl gallate, they are significantly less effective.

The proposed antioxidant formulation of the invention, for example, Formulation 1, performs significantly better compared to an antioxidant formulations based on single antioxidants gallic acid, propyl gallate, and octyl gallate. This superior activity of the proposed mixture may be explained by a synergistic effect of several antioxidants.

Example 6—Efficiency of the Liquid Antioxidant Formulation Compared with Pure Antioxidants Pure crystalline antioxidants (BHA, BHT, propyl gallate and octyl gallate) are essentially insoluble in a lipid matrix without heating. Consequently, the application of a liquid antioxidant formulation is beneficial for an adequate mixing of the antioxidant into the oil matrix without an additional heating of the lipophylic medium. Antioxidant activity of single antioxidants directly dissolved in soybean oil was tested at a level of 250 ppm, 500 ppm and 1000 ppm.

TABLE 2

OSI induction time of soybean oil stabilized with synthetic antioxidants
Experiment carrier out at 98° C., control soybean oil had
induction time of 14.8 h

| Antioxidant | Antioxidant concentration (ppm) | | |
|---|---|---|---|
| | 250 | 500 | 1000 |
| Ethoxyquin | 14.4 | | 12.5 |
| BHA | 14.0 | 15.5 | 21.5 |
| BHT | 17.9 | 20 | 25.6 |
| Gallic acid | 30.6 | 41.8 | 47.4 |
| Propyl gallate | 35.8 | 44.5 | 53.1 |
| Octyl gallate | 29.6 | 38.6 | 47.6 |
| Formulation 1 | 21.6 | 27.9 | 37.0 |

The developed antioxidant formulation, Formulation 1, has a high antioxidant capacity. As the antioxidant Formulation 1 is only based on 20% active antioxidants, the level of active antioxidants is consistently lower. For example, 1000 ppm of antioxidant Formulation 1 only represents 200 ppm active antioxidants.

At all tested concentration levels, 250, 500 and 1000 ppm, the proposed antioxidant Formulation 1 performs significantly better compared with single synthetic antioxidants, for example, ethoxyquin, BHA, and BHT. For example at a level of 1000 ppm the antioxidant Formulation 1 stabilizes the soybean oil for 37 h in OSI, whereas 1000 ppm of ethoxyquin, BHA and BHT only give a stabilization ranging between 12.5-25.6 h in OSI.

At a level of 1000 ppm, the developed antioxidant Formulation 1 stabilizes the soybean oil significantly better compared with 250 ppm of single gallic acid antioxidants, gallic acid, propyl gallate and octyl gallate.

This demonstrates the higher activity of the presented antioxidant system due to what is believed to be a synergistic activity of the different antioxidant mixtures and their excellent distribution in the lipid matrix. In addition, the proposed liquid antioxidant formulation has the advantage of dissolving directly in oils and fats, even at room temperature.

Although the invention has been described with respect to a preferred embodiment thereof, it is to be also understood that it is not to be so limited since changes and modifications can be made therein which are within the full intended scope of this invention as defined by the appended claims.

We claim:

1. A method of protecting oils and fats from oxidation, comprising the steps of:
   (a) formulating a homogenous single phase product substantially free of oils or fats comprising:
      i. a phenolic antioxidant composition having:
         A. at least one water-soluble antioxidant; and
         B. at least one lipid-soluble antioxidant selected from the group consisting of butylated hydroxytoluene (BHT), butylated hydroxyanisole (BHA), ethoxyquin, gallic acid and esters of gallic acid, flavones, phenolic di- and tri-terpenes, phenolic extracts of sage, phenolic extracts of rosemary, and phenolic extracts of thyme;
      ii. a liquid polar carrier selected from the group consisting of monopropylene glycol, polyethylene glycol, and glycerol;
      iii. an emulsifier; and
      iv. a polarity modifier;
   (b) adding the homogenous single phase product to the oil or fat; and
   (c) dissolving both the water-soluble and lipid-soluble antioxidants into the oil or fat by mixing.

2. A method as defined in claim 1, wherein the emulsifier is selected from the group consisting of acylglycerides, di-acylglycerides, phospholipids, and lysophospholipids.

3. A method as defined in claim 1, wherein the polarity modifier is selected from the group consisting of short chain fatty acids.

4. A method as defined in claim 3, wherein the short chain fatty acid is selected from the group consisting of propionic acid, butyric acid and acetic acid.

5. A method as defined in claim 1, further comprising a metal chelator.

6. A method as defined in claim 5, wherein the metal chelator comprises organic acids.

7. A method as defined in claim 6, wherein the organic acid is selected from the group consisting of ascorbic acid and citric acid.

8. The method of claim 1, wherein the method is carried out at ambient temperature.

9. The method of claim 1, wherein the antioxidant components are present in an amount between about 10 and about 30 weight percent of the homogenous product.

10. The method of claim 1, further comprising adding about 5% citric acid, and wherein the liquid polar carrier is between 25-30% monopropylene glycol, the polarity modifier is between 15-25% propionic acid and the emulsifier is between 25-30% monoglycerides.

11. The method of claim 1, further comprising adding about 5% citric acid, and wherein the lipid-soluble antioxidant is about 7% gallic acid, 10% propyl gallate, and 3% octyl gallate, the liquid polar carrier is about 27.5% monopropylene glycol, the polarity modifier is about 19% propionic acid, the emulsifier is about 26.5% monoglycerides, and about 2% phospholipids.

12. The method of claim 1, further comprising adding about 5% citric acid, and wherein the lipid-soluble antioxidant is about 7% gallic acid, 10% propyl gallate, and 2% octyl gallate, the liquid polar carrier is about 27% monopropylene glycol, the polarity modifier is about 20% propionic acid, and the emulsifier is about 29% monoglycerides.

13. A product made according to the method of claim 1, further comprising adding about 5% citric acid, and wherein the lipid-soluble antioxidant is about 17% propyl gallate and 2% octyl gallate, the liquid polar carrier is about 27% monopropylene glycol, the polarity modifier is about 20% propionic acid, and the emulsifier is about 29% monoglycerides.

14. The method of claim 1, further comprising adding about 5% citric acid, and wherein the lipid-soluble antioxidant is about 7% gallic acid and 10% propyl gallate, 27% the liquid polar carrier is about monopropylene glycol, the polarity modifier is about 20% propionic acid, and the emulsifier is about 29% monoglycerides.

15. The method of claim 1, further comprising adding about 5% citric acid, and wherein the lipid-soluble antioxidant is about 7% gallic acid, 10% propyl gallate, and 3% octyl gallate, the liquid polar carrier is about 30% monopropylene glycol, the polarity modifier is about 19% propionic acid, and the emulsifier is about 26% monoglycerides.

16. The method of claim 1, further comprising adding about 5% citric acid, and wherein the lipid-soluble antioxidant is about 7% gallic acid 12% propyl gallate, and 5% BHA, the liquid polar carrier is about 27% monopropylene glycol, the polarity modifier is about 20% propionic acid, and the emulsifier is about 29% monoglycerides.

17. The method of claim 1, wherein the dissolving of the water-soluble and lipid-soluble antioxidants into the oil or fat is performed at room temperature.

\* \* \* \* \*